United States Patent
Rector et al.

(10) Patent No.: US 8,630,622 B2
(45) Date of Patent: Jan. 14, 2014

(54) DEVICES, SYSTEMS AND METHODS FOR LOCATION ASSISTANCE VERIFICATION

(75) Inventors: Jay Daryl Rector, Loganville, GA (US); John Potts Davis, III, Marietta, GA (US); Justin Michael Anthony McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 414 days.

(21) Appl. No.: 12/632,202

(22) Filed: Dec. 7, 2009

(65) Prior Publication Data

US 2011/0136472 A1 Jun. 9, 2011

(51) Int. Cl.
*H04M 1/66* (2006.01)
*G06F 7/04* (2006.01)

(52) U.S. Cl.
USPC ............................. 455/411; 726/21

(58) Field of Classification Search
USPC ............................. 455/411; 726/21
See application file for complete search history.

(56) References Cited

U.S. PATENT DOCUMENTS

| | | | |
|---|---|---|---|
| 7,023,995 B2 | 4/2006 | Olsson | |
| 7,181,227 B2 | 2/2007 | Wilson | |
| 7,190,960 B2 | 3/2007 | Wilson | |
| 7,359,716 B2 | 4/2008 | Rowitch | |
| 7,505,757 B2 | 3/2009 | Rowitch | |
| 2003/0023726 A1* | 1/2003 | Rice et al. | 709/225 |
| 2005/0114694 A1* | 5/2005 | Wager et al. | 713/200 |
| 2008/0046979 A1* | 2/2008 | Oulahal | 726/4 |
| 2008/0119203 A1 | 5/2008 | Shalmon | |
| 2009/0054082 A1 | 2/2009 | Kim et al. | |
| 2009/0286536 A1 | 11/2009 | Shim | |

OTHER PUBLICATIONS

Broadcom Corporation, Secure User Plane Location, White Paper, Oct. 2007, Broadcom Corporation, Irvine, USA.

* cited by examiner

*Primary Examiner* — Kamran Afshar
*Assistant Examiner* — Omoniyi Obayanju
(74) *Attorney, Agent, or Firm* — Hartman & Citrin LLC (57) ABSTRACT

Devices, systems and methods are disclosed which authorize applications to access location-determining technologies on user devices and on service provider networks. An A-GPS agent resident on the device acts as an interface between applications requesting access to the user's location from the A-GPS chipset and helps to coordinate connections between the A-GPS chipset and the Assistance Server. Introduced into the network maintained by the service provider is a verification server running an application identification engine which determines if the request for preliminary location information engendered by the requesting application is approved.

11 Claims, 7 Drawing Sheets

DEVICES, SYSTEMS AND METHODS FOR LOCATION ASSISTANCE VERIFICATION

BACKGROUND OF THE INVENTION

1. Field of the Invention

The present invention relates to the field of communications networks and in particular, relates to devices, systems and methods for authorizing applications to access location-determining technologies and systems.

2. Background of the Invention

Integrating user position data into applications enables a wide variety of new features and capabilities for cellular telephones and smartphones, including "Location Based Services". In terms of device technology, the most common method of allowing devices to determine their position is to make use of Assisted GPS (A-GPS) technology. Broadly speaking, in such a system, the "A-GPS" chipset can use preliminary location information from an "Assistance Server" to help determine the nearest GPS satellite. Such a system has many advantages over installing a traditional GPS solution for determining the user's location, including lower cost and faster time-to-first-fix (TTFF).

However, many obstacles continue to present difficulties to the full integration of user location into cellular telephone and smartphone applications. One concern for both the telecommunication industry and its users is privacy. Disclosing the present location of a user in some circumstances could compromise user security and present liability issues for service providers and device manufacturers. For example, a rogue application gaining access to the user's location via the A-GPS chipset could conceivably disclose it to a third party without the user's authorization. Currently, protocols in place which govern the communication between Assistance Servers and A-GPS chipsets authorize access to the Assistance Server only via credentials which identify the user (such as their MSISDN), but not the application making the request for position information from the A-GPS chipset and Assistance Server.

Proposals have been made to integrate some kind of authorizing capability into the A-GPS chipset itself or the Assistance Servers which communicate with the A-GPS chipset. However, such solutions present significant technological obstacles to their implementation.

Thus, there is a clear need for devices, systems, and methods which authorize applications to access location-determining technologies on user devices and on service provider networks.

SUMMARY OF THE INVENTION

The present invention discloses methods, systems, and devices that authorize applications to access location-determining technologies on user devices and on service provider networks. An A-GPS agent resident on the device acts as an interface between applications requesting access to the user's location from the A-GPS chipset and helps to coordinate connections between the A-GPS chipset and the Assistance Server. Introduced into the network maintained by the service provider is a verification server running an application identification engine which determines if the request for preliminary location information engendered by the requesting application is approved.

In one exemplary embodiment, the present invention is a method for authorizing a requesting application to access a positioning technology resident on a mobile network device. The method includes opening a session on a mobile communications network, passing a plurality of credentials of the requesting application to a verification server via the session, and allowing the requesting application to access the positioning technology once the verification server approves the requesting application based on the plurality of credentials.

In another exemplary embodiment, the present invention is a mobile network device. The mobile network device includes a housing, a positioning technology coupled to the housing, a positioning technology agent running on the mobile network device in communication with the positioning technology and a verification server. The positioning technology agent opens a session on a mobile communications network, passes a plurality of credentials from a requesting application to the verification server, and allows the requesting application to make a dip to the positioning technology once the verification server approves the requesting application based on the credentials.

In yet another exemplary embodiment, the present invention is a system which authorizes a requesting application running on a mobile network device to access a positioning technology resident on the mobile network device. The system includes a mobile communications network to which the mobile network device is attached, a verification server in communication with the mobile network device via the mobile communications network. The requesting application transmits a plurality of credentials of the requesting application to the verification server and accesses the positioning technology once the verification server grants the requesting application access based on the plurality of credentials.

DETAILED DESCRIPTION OF THE INVENTION

The present invention discloses methods, systems, and devices that authorize applications to access location-determining technologies on user devices and on service provider networks. An A-GPS agent resident on the device acts as an interface between applications requesting access to the user's location from the A-GPS chipset and helps to coordinate connections between the A-GPS chipset and the Assistance Server. Introduced into the network maintained by the service provider is a verification server running an application identification engine which determines if the request for preliminary location information engendered by the requesting application is approved.

Embodiments of devices of the present invention include a mobile network device provisioned with such an A-GPS agent which acts as an interface between applications requesting access to the user's location from the A-GPS chipset, helps to coordinate connections between the A-GPS chipset and the Assistance Server, and runs a GPS security application that notifies the user when an unauthorized attempt is made to access the A-GPS chipset.

As used herein and throughout this disclosure, a "mobile network device" refers to any information-processing mobile device able to maintain a connection to a network over which it exchanges information with other mobile devices or remote hosts. Examples of such mobile network devices include laptop computers; personal digital assistants (PDAs); netbooks; cellular telephones; smartphones; etc. Examples of networks over which such devices communicate include GSM networks, GPRS networks, GSM EDGE networks, UMTS networks, CDMA networks, etc. As used herein and throughout this disclosure, a "mobile communications network" is a network over which a mobile network device exchanges information.

As used herein and throughout this disclosure, "credentials" of an application refer to a means of identifying the application or one of its privileges, such as access to a particular server, in one particular context. Examples of credentials include tokens, hashes, certificates, etc.

As used herein and throughout this disclosure, a "dip" by an application to an A-GPS or GPS chipset refers to a request by the application for the user's present location, as determined by the A-GPS or GPS chipset. As used herein and throughout this disclosure, a "positioning technology" refers to a technology which determines the location of a user. Examples of such user location-determining technologies include GPS chips, A-GPS chips, enhanced 9-11 engines (e911), etc.

As used herein and throughout this disclosure, "preliminary location information" refers to information used by an A-GPS chipset to aid in the determination of the present location of a user. Examples of information commonly provided to A-GPS chipsets to aid in such determinations include the approximate location of the user, as determined by the coordinates of the base station to which the user is currently connected; GPS satellite orbital information; the identities of the GPS satellites most relevant to the location determination; etc.

As used herein and throughout this disclosure, a "session" on a mobile communications network refers to a connection between an application on a mobile network device and some entity over which data is transferred. Each instance when an application communicates with an entity requires an established session. As used herein and throughout this disclosure, "session ID information" refers to information that uniquely identifies the session. Typically, such session ID information can be found in "Call Data Records" (CDRs) maintained by the service provider. As used herein and throughout this disclosure, a "supporting gateway" refers to hardware responsible for setting up, maintaining, and recording properties of a session. An example of such a supporting gateway is a Serving GPRS Support Node (SGSN) in a General Packet Radio Service (GPRS) network.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a mobile communications network, logic may be programmed on a server, or a complex of servers. A particular logic unit is not limited to a single logical location on the telecommunication network. Logic may be referred to as an engine, agent, etc.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
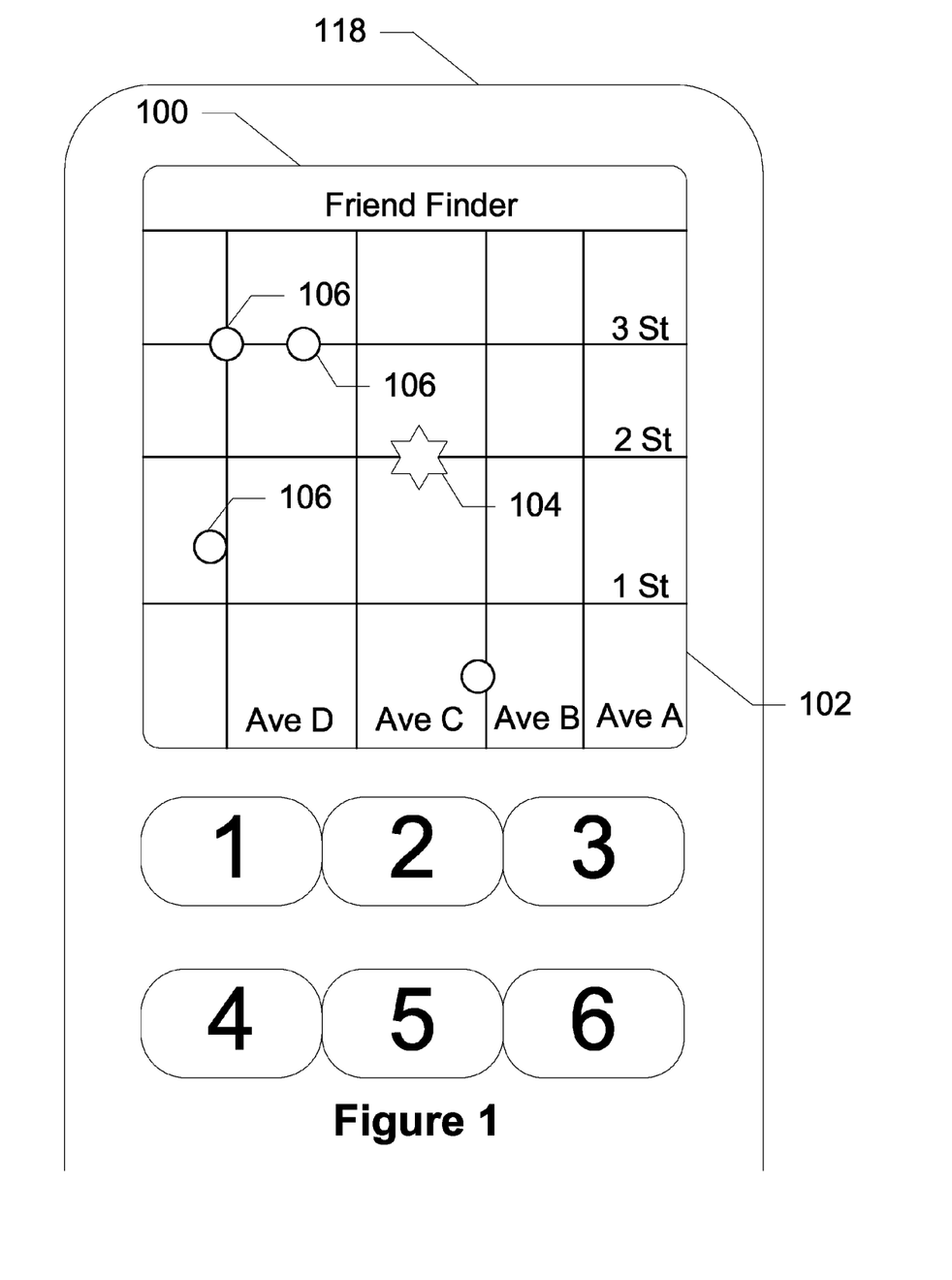
FIG. 1 displays a screenshot of a typical application making use of the user's present location.

FIG. 1 displays a screenshot 100 of a typical application making use of the user's present location on a mobile network device 118. The application, named "Friend Finder", displays a map 102, showing a location of the user 104, and a plurality of locations of friends of the user, 106. In this example, the "Friend Finder" application 100, making use of an AGPS chipset on the user's mobile network device, uploads the user's present location 104 to a remote server. The remote server responds with the current locations of any friends 106 within a two block radius of the user's present location 104 for display on the user's mobile network device.

In other embodiments, the radius is determined by the user. The user may be able to zoom in and out of the map on the mobile network device to view more or less friends.

Figure 2:
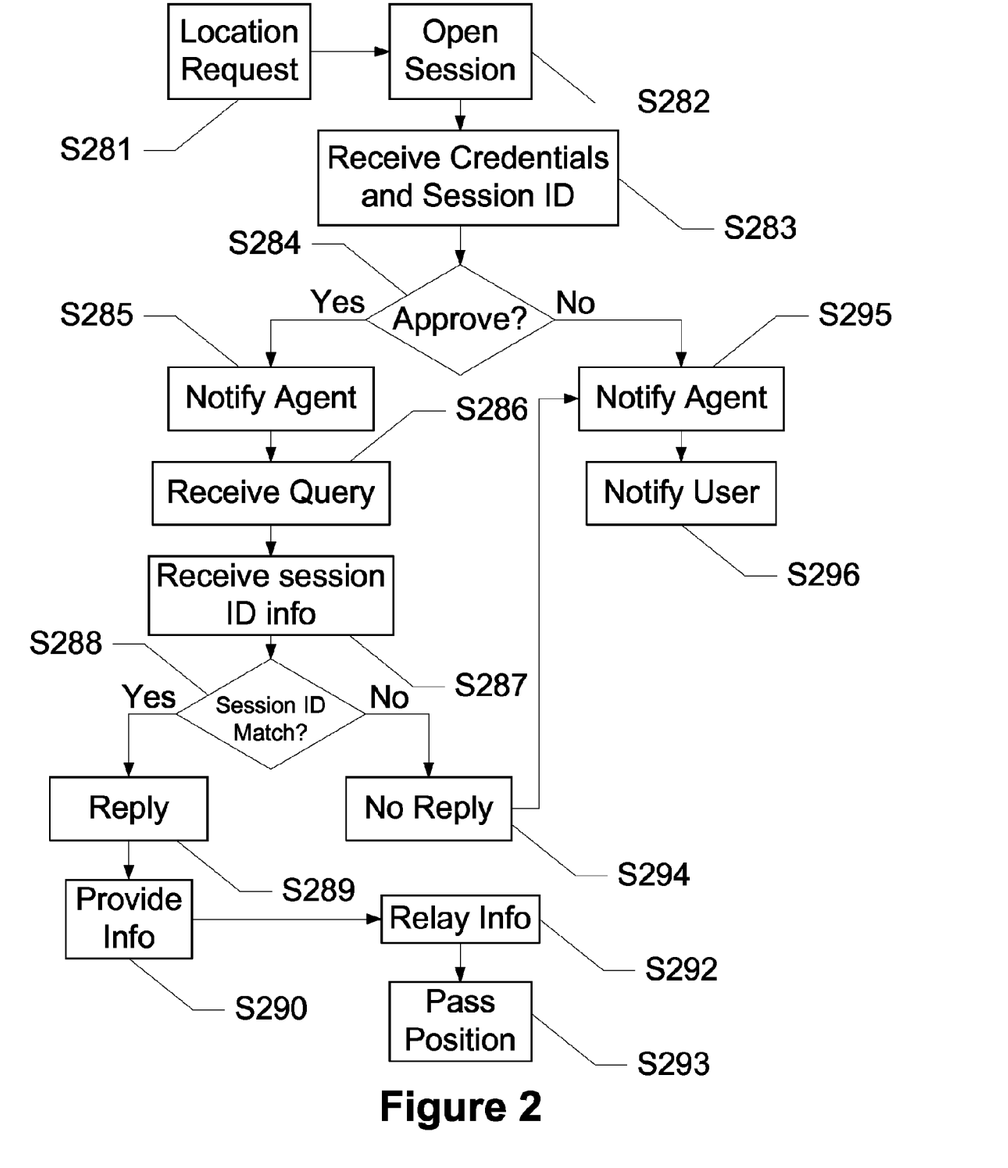
FIG. 2 displays a general method for authorizing applications to access the A-GPS chipset of a mobile network device according to one embodiment of the present invention.

FIG. 2 displays a general method for authorizing applications to access an A-GPS chipset of a mobile network device according to one embodiment of the present invention. The method begins as the requesting application requests the present location of the user from the A-GPS chipset via an A-GPS agent, S281. Thereupon, the A-GPS agent directs the mobile network device to initiate a session on the mobile communications network for a connection with a verification server and an Assistance Server, S282. In this embodiment of the method, the mobile communications network includes a packet data network over which the mobile network device communicates with the verification server and Assistance Server, and initiation of such a session includes establishing a Packet Data Protocol (PDP) context on a supporting gateway for the session. Thereupon, the A-GPS agent passes the verification server credentials from the requesting application and the supporting gateway appends this message with session ID information for this session, S283. Based on the received credentials, the verification server either approves or does not approve the requesting application for access to the A-GPS chipset, S284.

If the verification server does not approve the requesting application, then the verification server notifies the A-GPS agent that the requesting application is not approved, S295. Thereupon, the A-GPS agent passes an alert to a GPS security application running on the mobile network device, which notifies the user that an unauthorized application attempted to access the user's current location, S296.

If the verification server approves the requesting application, then the verification server notifies the A-GPS agent that the requesting application is approved, S285. Thereupon, the A-GPS agent sends the Assistance Server a preliminary location information query, using the already-established session on the packet data network. The supporting gateway appends session ID information onto the message for which the query is sent, S286. In some embodiments, such a query includes information identifying the mobile network device to the Assistance Server, such as its MSISDN. Thereupon, the Assistance Server passes the session ID information received to the verification server, 287. Thereupon, a session ID checking logic running on the verification server checks to make sure that the session ID information passed by the Assistance Server to the verification server is equivalent to the session ID information for the delivery of the credentials to the verification server, S288. The purpose of this step in the method is to ensure that the application that generated the preliminary location information query to the Assistance Server is the same as the application which passes credentials to the verification server; if these applications are not identical, that would be reflected in differing session ID information for the different sessions over which the distinct applications communicate with the Assistance Server and verification server.

If the session ID information passed to the verification server does not match the session ID information corresponding to the delivery of the credentials to the verification server, then the verification server directs the assistance server not to reply to the preliminary location information query, S294, and the method continues at S295.

If the session ID information passed to the verification server matches the session ID information corresponding to the delivery of the credentials to the verification server, then the verification server directs the Assistance Server to reply to its received preliminary location information query, S289. Thereupon, the Assistance Server sends preliminary location information to the A-GPS agent, again via the established session, S290. Thereupon, the A-GPS agent relays the preliminary location information to the A-GPS chipset, S292. Thereupon, the A-GPS chipset calculates the user's present location based on the received preliminary location information and received GPS satellite signals and, via the A-GPS agent, passes the calculated present user location to the requesting application, S293.

Figure 3A:
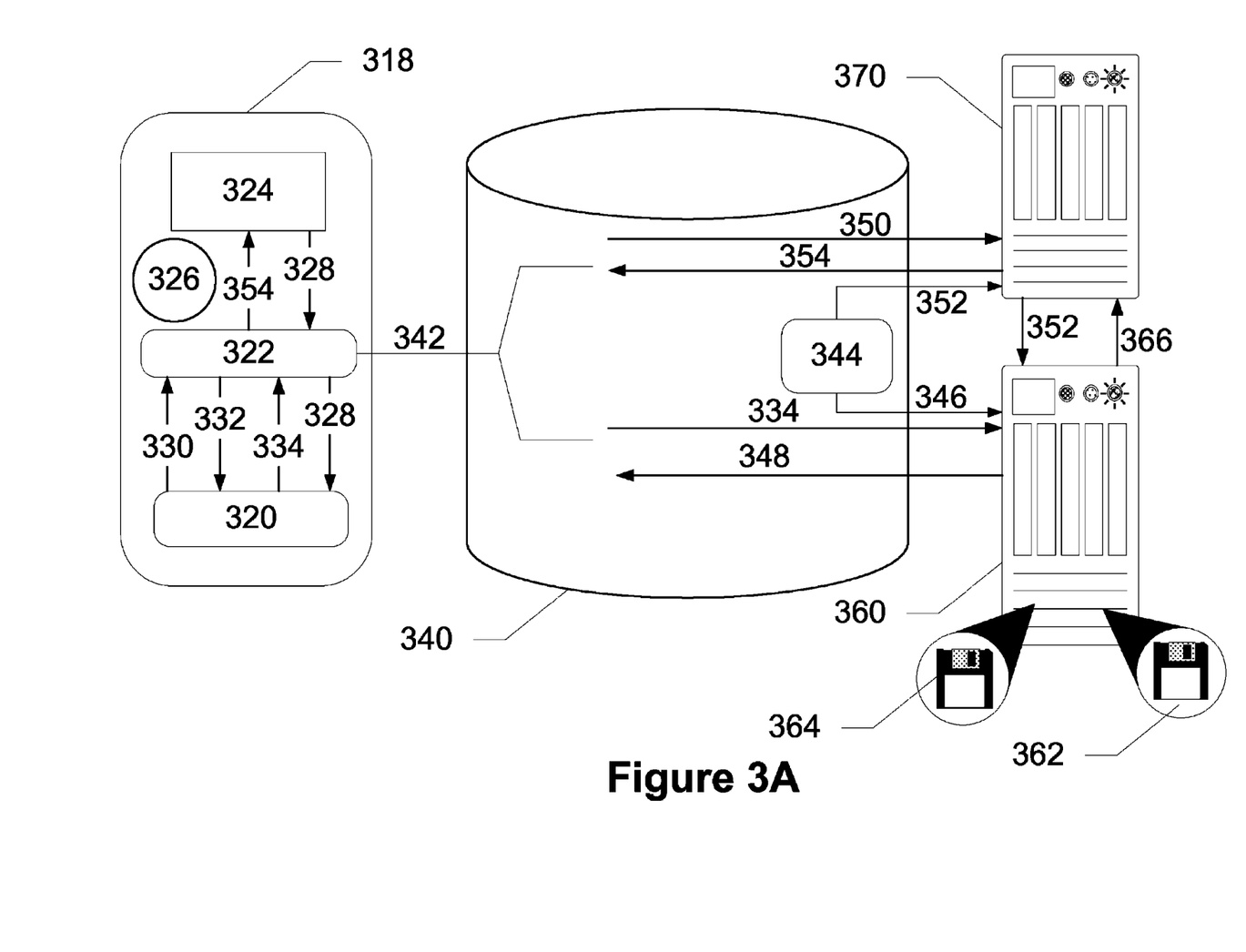
FIGS. 3A, 3B, and 3C display the flow of information over a mobile communications network during authorization of a requesting application according to one embodiment of the present invention.
Figure 3B:
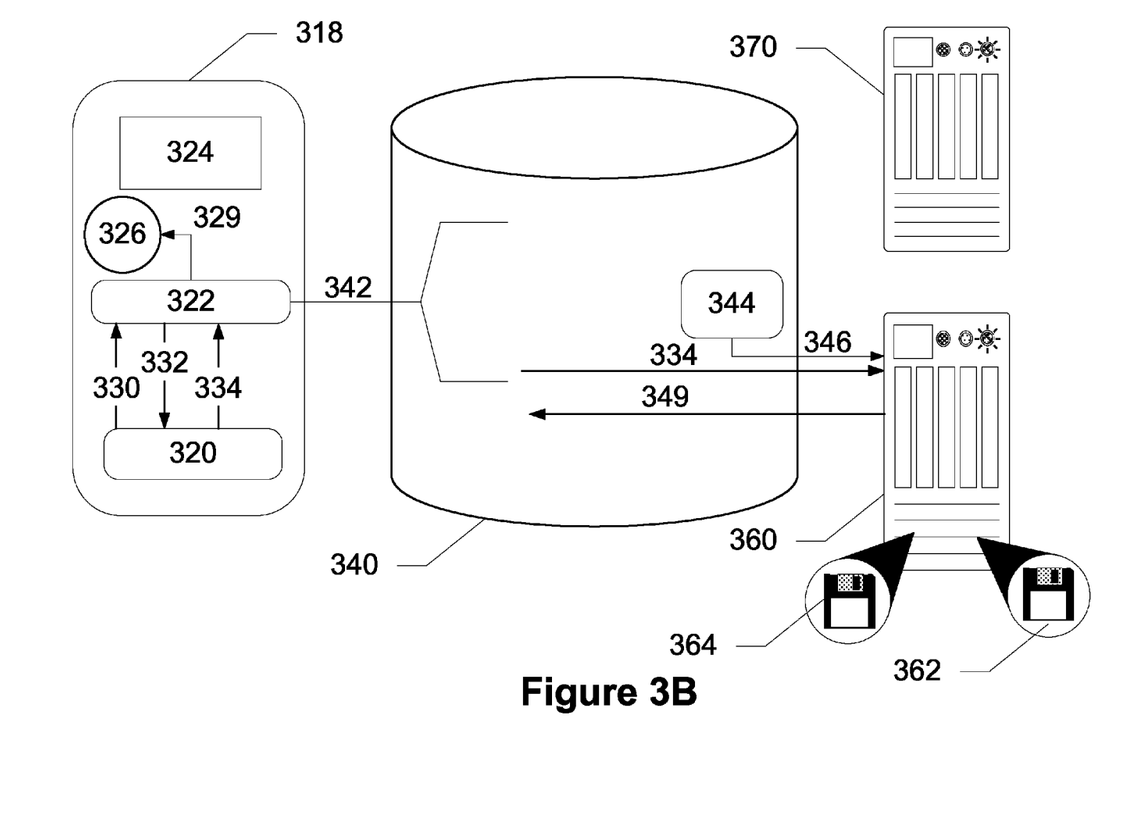
Figure 3C:
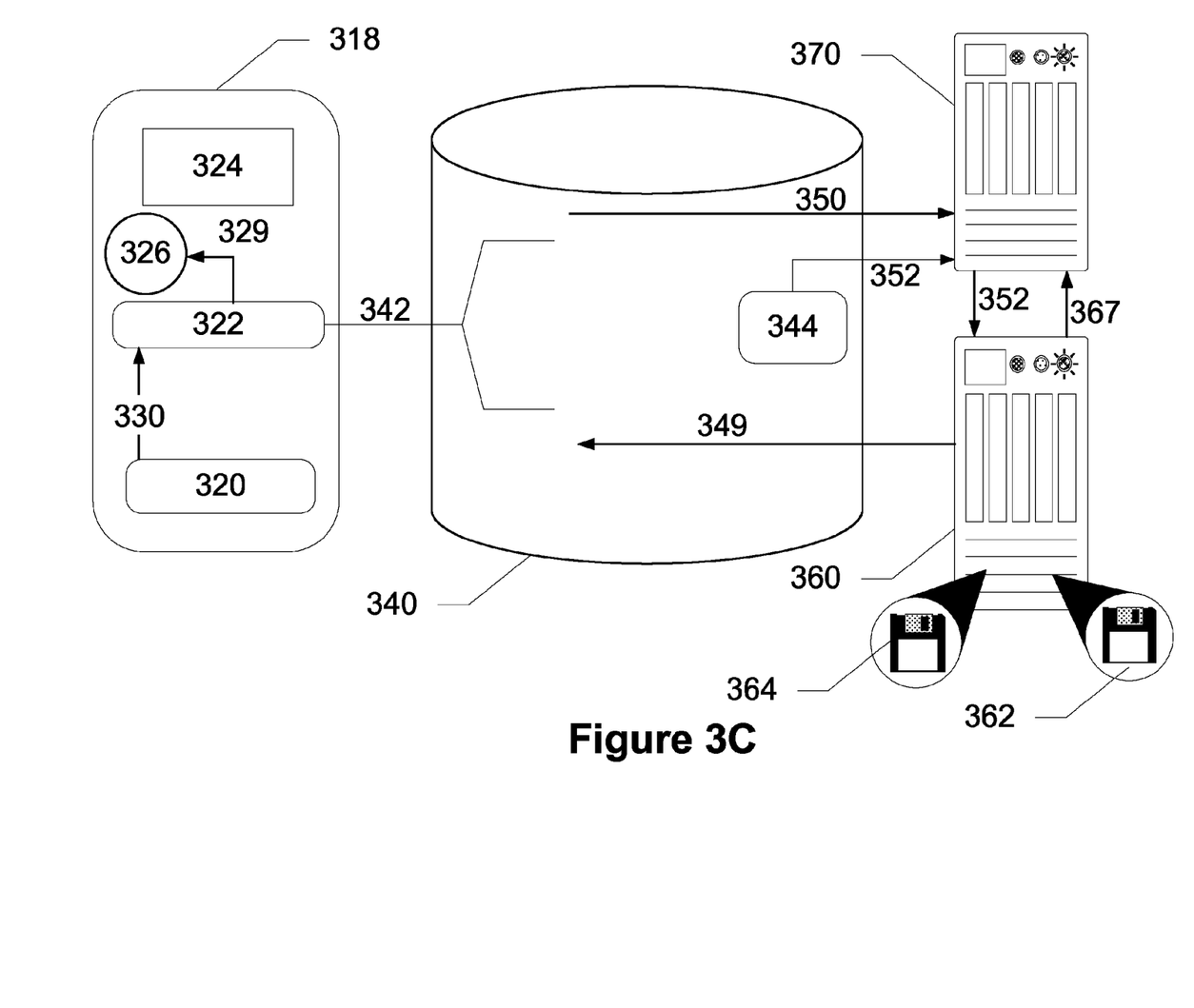

FIGS. 3A, 3B, and 3C display the flow of information over a mobile communications network to which a mobile network device 318, including a memory and processor within a housing, is attached during authorization of a requesting application 320 according to one embodiment of the present invention.

FIG. 3A displays the flow of information in a case where requesting application 320 is authorized to make a dip to an A-GPS chipset 324. In this embodiment, mobile network device 318 is provisioned with an A-GPS agent 322 which acts as an interface between applications requesting access to the user's location and A-GPS chipset 324. Mobile network device 318 is also provisioned with a GPS security application 326 that notifies the user when an unauthorized attempt is made to access A-GPS chipset 324. Requesting application 320 passes a request for the user's present location 330 to A-GPS agent 322. A-GPS agent 322 responds with a request for a plurality of credentials 332 for requesting application 320. Requesting application 320 responds to this request by passing a plurality of credentials 334 to A-GPS agent 322.

Once A-GPS agent 322 receives credentials 334, it initiates a session 342 on the mobile communications network. In this embodiment, such initiation includes establishing a Packet Data Protocol (PDP) context on a supporting gateway 340 for the session. Supporting gateway 340 includes a billing database 344 storing a plurality of call data records including session ID information which uniquely identify every session established on supporting gateway 340. Via session 342, A-GPS agent 322 passes credentials 334 to a verification server 360. In some embodiments, such a message is delivered using the Transmission Control Protocol/Internet Protocol (TCP/IP) set of transmission protocols. In other embodiments, such a message is delivered using the User Datagram Protocol (UDP) transmission protocol. Verification server 360 includes an application identification engine 362 and a session ID checking logic 364. In some embodiments, application identification engine 362 includes a database of approved applications and checks credentials 334 to see if requesting application 320 is included in the database of approved applications. Appended to this message, supporting gateway 340, via billing database 344, passes a plurality of session ID information 346 for this session in which credentials 334 are passed. In some embodiments, such session ID information includes information identifying the PDP context of session 342. In this case, application identification engine 362 approves requesting application 320 based on credentials 334 and logs this application approval, identified by session ID information 346, in session ID checking logic 364. Thereupon, verification server 360, via session 342, sends an application approval message 348 to A-GPS agent 322.

Upon reception of application approval message 348, A-GPS agent 322, via session 342, sends a preliminary location information query 350 to an Assistance Server 370. In some embodiments, preliminary location information query 350 corresponds to a Secure User Plane Location (SUPL) query and Assistance Server 370 corresponds to a SUPL Location Platform (SLP) which is in communication with a global network of servers tracking orbital data for GPS satellites. As before, supporting gateway 340, via billing database 344, passes a plurality of session ID information 352 for this session in which preliminary location information query 350 is passed to Assistance Server 370. Upon reception of preliminary location information query 350, Assistance Server 370 passes session ID information 352 to verification server 360.

ID checking logic 364 receives session ID information 352, and compares it to session ID information 346 for the previously logged application approval. In this case, since they correspond to the same session on the mobile communications network, session ID information 352 and session ID information 346 match, and verification server 360 sends Assistance Server 370 a query response approval 366. Upon reception of query response approval 366, Assistance Server 370 passes preliminary location information 354 to A-GPS agent 322 via session 342. A-GPS agent 322 passes preliminary location information 354 to A-GPS chipset 324. A-GPS chipset 324 calculates a present location of the user 328 based on preliminary location information 354 and signals received from a plurality of GPS satellites. Thereupon, A-GPS chipset 322 sends present location of the user 328 to requesting application 320 via A-GPS agent 322.

FIG. 3B displays the flow of information in a case where verification server 360 does not accept credentials 334 of requesting application 320. Requesting application 320 passes a request for the user's present location 330 to A-GPS agent 322. A-GPS agent 322 responds with a request for credentials 332 for requesting application 320. Requesting application 320 responds to this request by passing credentials 334 to A-GPS agent 322.

Once A-GPS agent 322 receives credentials 334, it initiates a session 342 on the mobile communications network. Via session 342, A-GPS agent 322 passes credentials 334 to a verification server 360. Appended to this message, supporting gateway 340, via billing database 344, passes a plurality of session ID information 346 for this session in which credentials 334 are passed to verification server 360. In this case, application identification engine 362 does not approve credentials 334 of requesting application 320. Thereupon, verification server 360, via session 342, sends an application denial message 349 to A-GPS agent 322.

Upon reception of application denial message 349, A-GPS agent 322 passes an unauthorized application notice 329 to GPS security application 326. Unauthorized application notice 329 includes information identifying requesting application 320. In this embodiment, GPS security application 326 notifies the user of the unauthorized attempt by requesting application 320 to access A-GPS chipset 324. GPS security application 326 then notifies the service provider of mobile communications network of the unauthorized attempt, and gives the user the option to run virus-checking applications for mobile network device 318.

FIG. 3C displays the flow of information in a case where Assistance Server 370 rejects query for preliminary location information 350 because session ID information 352 of query for preliminary location information 350 does not match session ID information for a session in which credentials are accepted by verification server 360. There are many possible ways such a case could occur. For example, a virus could compromise the proper functioning of A-GPS agent 322 so that it omits to pass any credentials to verification server 360 before initiating query for preliminary location information 350. In another example, mobile network device 318 could be a legacy device not provisioned with A-GPS agent 322, but still able to connect to Assistance Server 370.

In this case, via supporting gateway 340, preliminary location information query 350 is sent to Assistance Server 370 via session 342, which is not necessarily established by A-GPS agent 322. Supporting gateway 340, via billing database 344, passes a plurality of session ID information 352 for this session in which preliminary location information query 350 is passed to Assistance Server 370. Upon reception of preliminary location information query 350, Assistance Server 370 passes session ID information 352 to verification server 360. In this case, session ID information 352 does not correspond to any of the logged session ID information corresponding to sessions in which requesting applications are approved in session ID checking logic 364. Therefore, verification server 360 sends a query response denial message 367 to Assistance Server 370 and an application denial message 349 to mobile network device 318 via session 342.

In the event mobile network device 318 is equipped to receive such a message, A-GPS agent 322 passes a unauthorized application notice 329 to GPS security application 326, which then notifies the user of the unauthorized attempt by requesting application 320 to access A-GPS chipset 324.

In an alternative embodiment of FIGS. 3A, 3B, and 3C, as an added layer of security, if the verification server approves the credentials of the requesting application, then the verification server replies to the A-GPS agent with a token valid only for the current session. The A-GPS agent includes the token with the query. The Assistance Server passes the token along with the session ID information to the verification server. The session ID checking logic correlates the received token and the received session ID information passed from the Assistance Server with the logged token and logged session ID information from the authentication of the requesting application credentials to determine if the Assistance Server sends preliminary location information to the A-GPS agent.

Figure 4A:
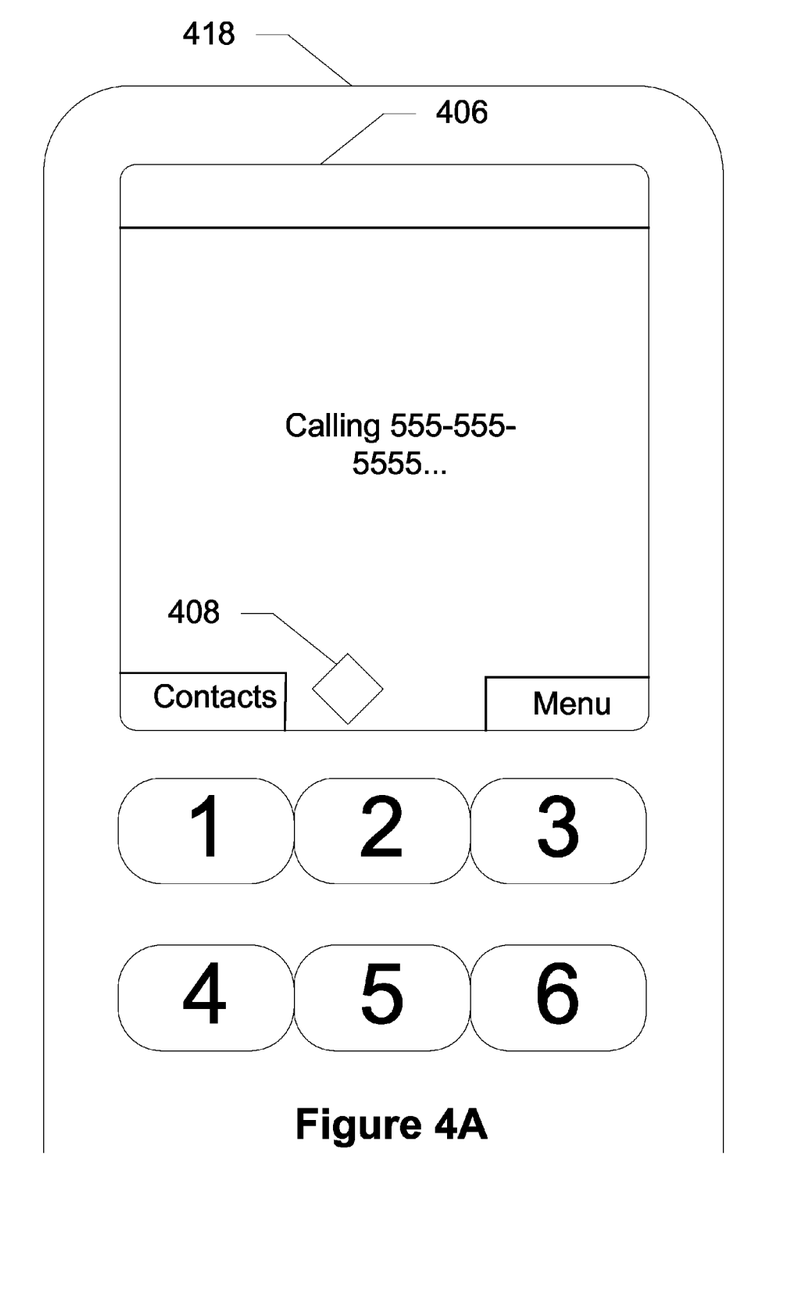
FIGS. 4A and 4B display screenshots of a mobile network device illustrating the operation of the GPS security application in one embodiment of the present invention.
Figure 4B:
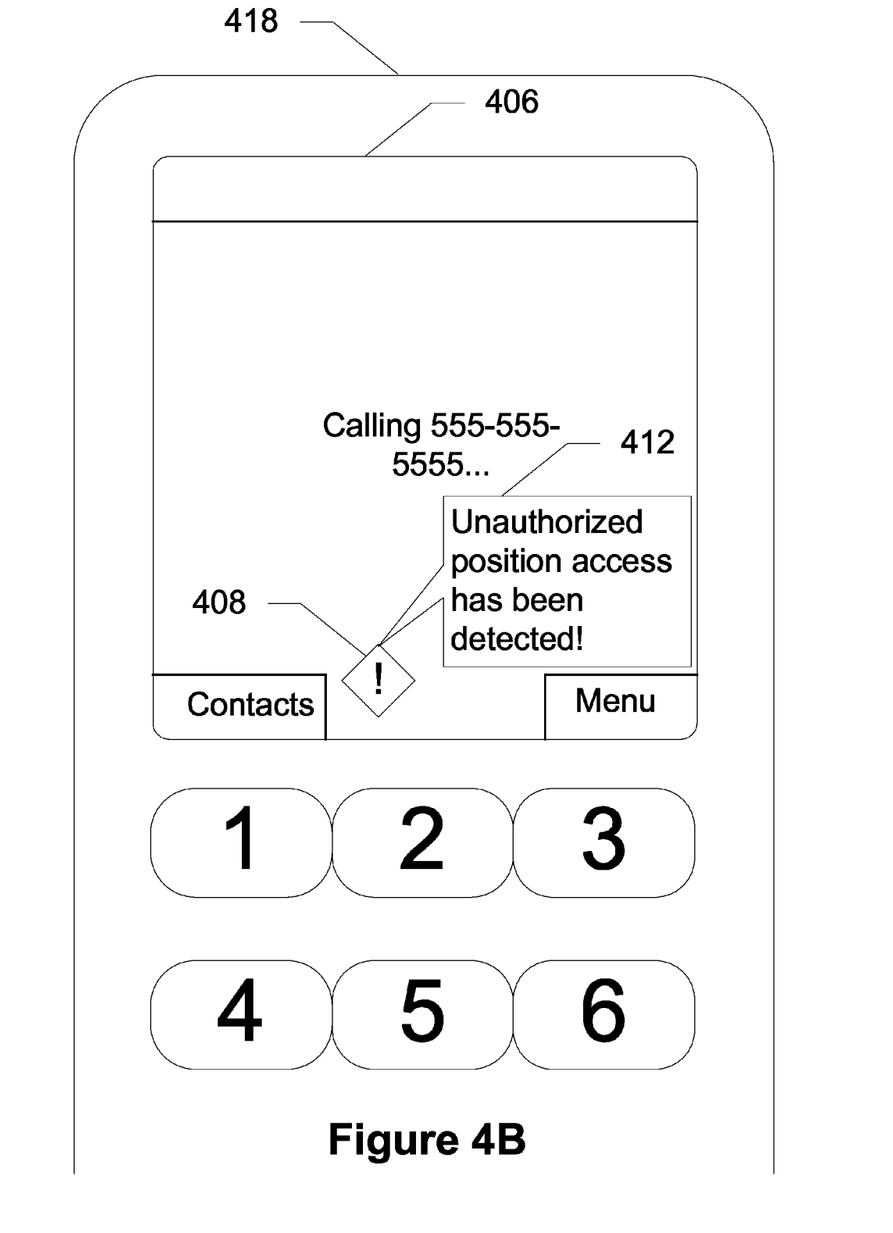

FIGS. 4A and 4B display screenshots of a mobile network device illustrating the operation of a GPS security application 408 in one embodiment of the present invention.

FIG. 4A displays a screenshot 406 illustrating how GPS security application 408 operates discretely "in the background" while other device functions (such as making a phone call) occur on a mobile network device 418.

FIG. 4B displays a screenshot 406 illustrating how GPS security application 408 notifies the user when an attempt by an unauthorized application to access the A-GPS chipset is detected by the A-GPS agent on mobile network device 418. In this embodiment, the user is able to click on a notification 412 to receive more information about the unauthorized attempt, optionally run virus-checking applications, and notify the user's service provider of the unauthorized attempt to access the A-GPS chipset.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   utilizing a mobile device comprising a processor for transmitting a credential request to a requesting application resident on the mobile device, the credential request being generated by an agent resident on the mobile device in response to the agent receiving a location request from the requesting application, the credential request comprising a first session identification;
   upon receiving the credential request from the requesting application, utilizing the processor for passing a credential of the requesting application to a verification server via a session comprising a second session identification;
   upon receiving a notification of approval, utilizing the processor for transmitting a preliminary location query to an assistance server via the session, the notification of approval indicating that the first session identification is the same as the second session identification, and
   upon receiving a notification of denial, displaying an unauthorized application alert on the mobile device, the notice of denial indicating that the first session identification is not the same as the second session identification.

2. The method of claim 1, wherein the agent communicates with an assisted GPS chipset on the mobile device.

3. The method of claim 2, further comprising providing, from the assistance server, preliminary location information to the assisted GPS chipset.

4. A mobile network device comprising:
   a processor; and
   a memory storing a logic that, when executed by the processor, causes the processor to perform operations comprising:
      generating a credential request for a credential of a requesting application in response to receiving a request for access to a positioning device coupled to the processor from the requesting application, the credential request comprising a first session identification, transmitting the credential request to the requesting application, upon receiving the credential from the requesting application, passing the credential of the requesting application to a verification server via a session comprising a second session identification, receiving, from the verification server, a notification of approval or a notification of denial, upon receiving the notification of approval from the verification server, transmitting a preliminary location query to an assistance server via the session, the notification of approval indicating that the first session identification is the same as the second session identification, and upon receiving the notification of denial from the verification server, displaying an unauthorized application alert, the notice of denial indicating that the first session identification is not the same as the second session identification.

5. The mobile network device of claim 4, wherein the positioning device comprises an assisted GPS chipset.

6. The mobile network device of claim 5, wherein the assisted GPS chipset determines a location of the mobile network device using a plurality of preliminary location information from the assistance server.

7. The mobile network device of claim 6, wherein the assisted GPS chipset receives the preliminary location information from the assistance server once the verification server approves the requesting application based on the credential.

8. The mobile network device of claim 4, wherein a GPS security application running on the mobile network device generates the unauthorized application alert.

9. A mobile network device comprising:
   a processor; and
   a memory storing a logic that, when executed by the processor, causes the processor to perform operations comprising:
      transmitting to a requesting application a request for a credential of the requesting application, the request comprising a first session identification;
      passing the credential of the requesting application to a verification server via a session comprising a second session identification,
      upon receiving a notification of approval from the verification server, transmitting a preliminary location query to an assistance server via the session, the notification of approval indicating that the first session identification is the same as the second session identification, and
      upon receiving a notification of denial from the verification server, displaying an unauthorized application alert, the notice of denial indicating that the first session identification is not the same as the second session identification.

10. The mobile network device of claim 9, further comprising an assisted GPS chipset.

11. The mobile network device of claim 9, further comprising a session ID checking logic running on the verification server.

* * * * *